(12) United States Patent
Hosaka et al.

(10) Patent No.: US 6,855,656 B2
(45) Date of Patent: Feb. 15, 2005

(54) POLYMERIZATION AND PROPYLENE BLOCK COPOLYMER

(75) Inventors: Motoki Hosaka, Kanagawa (JP); Hideo Tsukamoto, Kanagawa (JP); Hidetoshi Umebayashi, Kanagawa (JP); Makoto Nakano, Kanagawa (JP)

(73) Assignee: Toho Catalyst Co., Ltd., Kurobe (JP)

( * ) Notice: Subject to any disclaimer, the term of this patent is extended or adjusted under 35 U.S.C. 154(b) by 0 days.

(21) Appl. No.: 10/296,939

(22) PCT Filed: Mar. 28, 2002

(86) PCT No.: PCT/JP02/03045

§ 371 (c)(1),
(2), (4) Date: Dec. 10, 2002

(87) PCT Pub. No.: WO02/081527

PCT Pub. Date: Oct. 17, 2002

(65) Prior Publication Data

US 2003/0153454 A1 Aug. 14, 2003

(30) Foreign Application Priority Data

Mar. 30, 2001 (JP) ........................................ 2001-098041
Mar. 30, 2001 (JP) ........................................ 2001-098042

(51) Int. Cl.⁷ ............................................... C08F 4/654
(52) U.S. Cl. ........................ 502/118; 502/103; 502/115; 502/133; 502/134; 526/124.2; 526/124.3; 526/908
(58) Field of Search ................. 502/118, 115, 502/103, 133, 134; 526/124.2, 124.3

(56) References Cited

U.S. PATENT DOCUMENTS 4,686,265 A * 8/1987 Maruyama et al. ...... 526/124.4

FOREIGN PATENT DOCUMENTS

| EP | 461268 | 12/1991 |
| EP | 472946 | 3/1992 |
| EP | 751160 | 1/1997 |
| JP | 10-60041 | 3/1998 |
| JP | 10-176023 | 6/1998 |

* cited by examiner

*Primary Examiner*—Roberto Rabago
(74) *Attorney, Agent, or Firm*—Oblon, Spivak, McClelland, Maier & Neustadt, P.C.

(57) ABSTRACT

A propylene block copolymer with a high proportion of ethylene-propylene copolymer particles (rubber component) well dispersed in a propylene polymer exhibiting well-balanced rigidity and impact resistance can be obtained by using a solid catalyst for polymerization of olefins comprising (a) a solid catalyst component with controlled morphology, comprising magnesium, titanium, and a halogen atom, having an average particle diameter, specific surface area, and pore volume in a specific range, and having a pore size distribution in which an cumulative pore volume with a pore size of 100 Å or less is more than 50%, (b) an organoaluminum compound, and (c) an organosilicon compound. The block copolymer is very useful particularly for the application of vehicle parts such as a bumper and parts for household electric appliances.

7 Claims, 2 Drawing Sheets

POLYMERIZATION AND PROPYLENE BLOCK COPOLYMER

FIELD OF THE INVENTION

The present invention relates to a solid catalyst component for polymerization of olefins, a catalyst, and a propylene block copolymer. In particular, the present invention relates to a solid catalyst component for polymerization of olefins and a catalyst containing the solid catalyst component that can produce a propylene block copolymer, in which rubber components in the propylene polymers are well dispersed when the rubber components are produced at a higher ratio in the block copolymerization of propylene and ethylene, resulting in the propylene block copolymer free from adhesion due to a smaller amount of the rubber components on the surface and, in addition, exhibiting superior impact resistance. The present invention also relates to the resulting propylene block copolymer.

DESCRIPTION OF BACKGROUND ART

Isotactic polypropyrene has inferior impact resistance in spite of the superior rigidity and heat resistance. To improve the impact resistance of polypropylene while maintaining the superior rigidity, various technologies for producing resin compositions by combining ethylene-propylene rubber with crystalline polypropylene by polymer blend have been developed. However, producing a resin composition exhibiting well-balanced rigidity and impact resistance has been difficult because it is difficult to highly disperse different polymers at the micron level using a polymer blend technique. Polymer blend requires a very expensive process of kneading different types of polymers, which sometimes increases the polypropylene production cost at least twice that of conventional propylene polymers.

As a means for improving the problem in the polymer blend technique, a chemical blending method of polymerizing stepwise propylene and ethylene, and optionally other olefins, to produce a block copolymer has been studied. In a common chemical blending method, a block copolymer is manufactured in two or more steps, wherein propylene is first polymerized, then ethylene, propylene, and other olefins are copolymerized. In this instance, the proportion of rubbery polymer produced by the copolymerization of ethylene and propylene is increased in some processes to improve the impact resistance. However, the produced rubbery components may deposit on the surface of polymer particles, giving rise to adhesion among the polymer particles and adhesion of the polymers to the inner wall of the production apparatus. Because of this, it is difficult to produce a block copolymer for a long period of time in a stable manner.

To solve this problem Japanese Patent Application Laid-open No. 3-62805 discloses a solid catalyst component for polymerization of olefins having pores with a certain pore size. The solid catalyst component is produced by preparing a magnesium chloride-alcohol addition product, dealcholating the addition product with heating to produce porous magnesium carrier particles, and treating the porous magnesium carrier particles with a titanium compound.

A propylene block copolymer consists of a propylene polymer section (matrix) and an ethylene-propylene copolymer dispersed in the matrix. The propylene block copolymer produced using the above-mentioned conventional catalyst contains very large ethylene-propylene copolymer particles (or the polymer section) because of the large pore size in the solid catalyst component particles. Because of this, the ethylene-propylene copolymer particles may deposit on the surface of polymer particles. In particular, ethylene-propylene copolymer block particles continue to grow after the copolymer has been crystallized, making it difficult to obtain a block copolymer in which minute rubber components are sufficiently dispersed. For this reason, the impact resistance cannot be improved in spite of an increase in the proportion of rubber components. In this manner, no conventional catalysts could produce a propylene block copolymer with greatly improved impact resistance.

Therefore, an object of the present invention is to provide a solid catalyst component for polymerization of olefins and a catalyst containing the solid catalyst component that can produce a propylene block copolymer with a novel structure, in which rubber components (or ethylene-propylene copolymer) in the propylene polymers are well dispersed when the rubber components are produced at a higher ratio in the block copolymerization of propylene and ethylene, resulting in the propylene block copolymer containing polymer particles exhibiting only very slight adhesion among themselves and superior impact resistance, as well as the propylene block copolymer produced using such a catalyst.

DISCLOSURE OF THE INVENTION

In view of this situation, the inventors of the present invention have conducted extensive studies and have found that if propylene is first polymerized, and then ethylene and propylene are copolymerized using a solid catalyst component with controlled morphology, the ethylene-propylene copolymer, which is a rubber component, can be well dispersed in the propylene polymer at a high proportion and a propylene block copolymer having a novel structure with superior impact resistance can be obtained, that since the proportion of rubbers on the particle surface of this propylene block copolymer is small the polymer particles do not adhere among themselves nor adhere to the inner walls of manufacturing equipment, and further that a high quality propylene block copolymer can be consistently manufactured using such a catalyst component. These findings have led to the completion of the present invention.

Specifically, the present invention provides a solid catalyst component for polymerization of olefins comprising magnesium, titanium, and a halogen atom, having an average particle diameter of 1 to 100 $\mu$m, a specific surface area of 100 to 500 m$^2$/g, a pore volume of less than 0.3 ml/g, and a pore size distribution in which an cumulative pore volume with a pore diameter of 100 Å or less is more than 50%.

The present invention further provides a catalyst for polymerization of olefins comprising:

(A) the above solid catalyst component for polymerization of olefins and (B) an organoaluminum compound of the following formula (1), $$R^1_p AlQ_{3-p} \tag{1}$$

wherein R$^1$ represents an alkyl group having 1 to 4 carbon atoms, Q represents a hydrogen atom or a halogen atom, and p represents an integer satisfying the formula 0<p$\leq$3.

The present invention further provides a catalyst for polymerization of olefins comprising:

(A) the above solid catalyst component for polymerization of olefins, (B) an organoaluminum compound of the following formula (1), $$R^1_p AlQ_{3-p} \tag{1}$$

wherein R[1] represents an alkyl group having 1 to 4 carbon atoms, Q represents a hydrogen atom or a halogen atom, and p represents an integer satisfying the formula 0<p≦3, and (C) an external electron donor compound.

The present invention further provides a propylene block copolymer comprising 20 to 80 wt % of a propylene polymer and 20 to 80 wt % of an ethylene-propylene copolymer, with the ethylene-propylene copolymer being finely dispersed in the propylene polymer as amorphous sections, wherein when the amorphous ethylene-propylene copolymer sections are converted into a circle with the same area, the circle has an average diameter (Dr) satisfying the following formula (2), $$Dr(\mu m) \leq 0.005 \times A \quad (2)$$

wherein A indicates the amount (wt %) of the ethylene-propylene copolymer in the propylene block copolymer, satisfying the formula 20≦A(wt %)≦80.

Moreover, the present invention provides a propylene block copolymer comprising 20 to 80 wt % of a propylene polymer and 20 to 80 wt % of an ethylene-propylene copolymer, wherein the propylene polymer and ethylene-propylene copolymer are entangled with each other, forming amorphous propylene polymer sections and amorphous ethylene-propylene copolymer sections, wherein when the amorphous ethylene-propylene copolymer sections are converted into a circle with the same area, the circle has an average diameter (Dr) satisfying the following formula (2), $$Dr(\mu m) \leq 0.005 \times A \quad (2)$$

wherein A is the same as defined above.

The present invention further provides a propylene block copolymer comprising 20 to 80 wt % of a propylene polymer and 20 to 80 wt % of an ethylene-propylene copolymer, wherein the propylene block copolymer is in the form of particles with an average particle diameter of 100 to 5,000 $\mu m$ and the proportion of the ethylene-propylene copolymer on the surface of the particles is 0.3 vol % or less of the total amount of the ethylene-propylene copolymer particles.

The present invention further provides a propylene block copolymer produced by first polymerizing propylene and then copolymerizing ethylene and propylene, or more specifically a propylene block copolymer produced by first polymerizing propylene and then copolymerizing ethylene and propylene using a catalyst containing a solid catalyst component comprising magnesium, titanium, and a halogen atom, having an average particle diameter of 1 to 100 $\mu m$, a specific surface area of 100 to 500 m$^2$/g, a pore volume of less than 0.2 ml/g, and a pore size distribution in which an cumulative pore volume with a pore diameter of 100 Å or less is more than 50%.

DETAILED DESCRIPTION OF THE PREFERRED EMBODIMENTS

Figure 1:
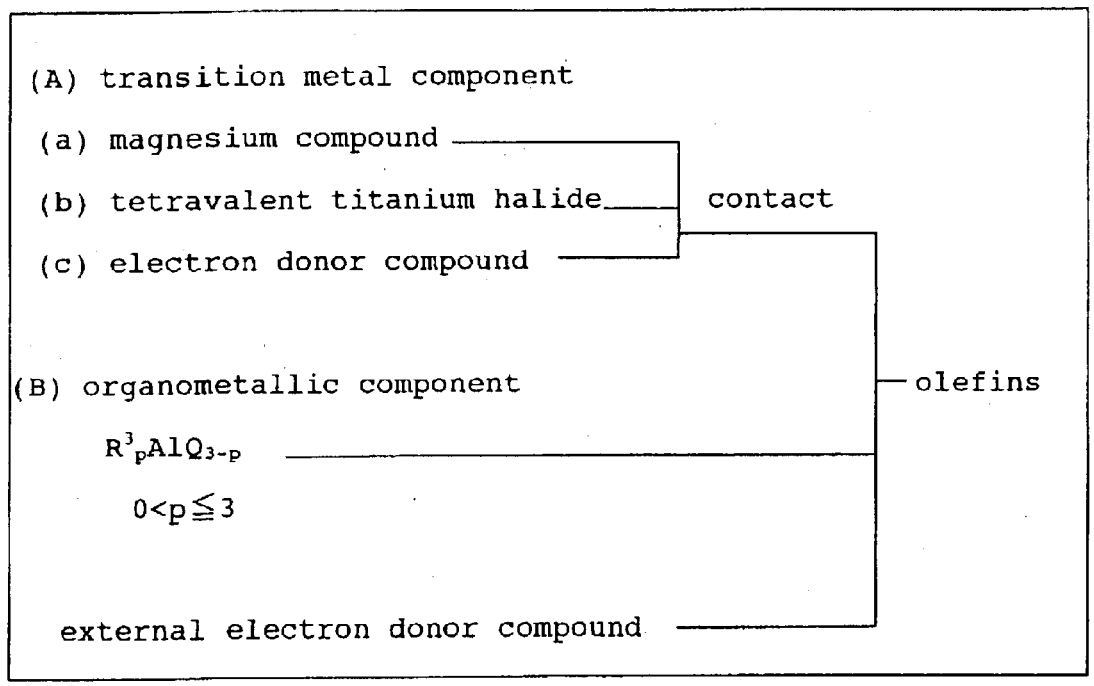
FIG. 1 is a flow chart showing a process for preparing the polymerization catalyst of the present invention.

The solid catalyst component for olefin polymerization (hereinafter referred to from time to time as "component (A)") contains magnesium, titanium, and a halogen atom. In particular, the component (A) is prepared by causing a magnesium compound, a titanium halide, and an electron donor compound to come into contact and has particle properties shown in Table 1, wherein the specific surface area and pore volume are measured by the BET method, and the pore size distribution was calculated in accordance with the BJH (Barrett, Joyner, Halenda) method based on a t-plot using a set of data on relative pressure and adsorption volume obtained during the analysis. These series of data were measured using an ASAP 2405 manufactured by Shimadzu Corp.

TABLE 1

| Particle properties | Preferable range | Particularly preferable range |
|---|---|---|
| Average pore diameter ($\mu m$) | 1 to 100 | 20 to 50 |
| Specific surface area (m$^2$/g) | 100 to 500 | 200 to 500 |
| Pore volume (ml/g) | 0.3 or less | 0.1 to 0.2 |
| Pore size distribution 1 | Cumulative pore volume with pore size of 100Å or less: more than 50% | Cumulative pore volume with pore size of 100Å or less: 80% or more |
| Pore size distribution 2 | Cumulative pore volume with pore size of 100Å or less: more than 50% | Average pore diameter: 10 to 60Å (In addition to the requirement for the pore size distribution 1) |
| Pore size distribution 3 | Cumulative pore volume with pore size of 50Å or less: 30% or more | Cumulative pore volume with pore size of 50Å or less: 50% or more |

The component (A) of the present invention comprises particles having a small pore volume. The particles contain a small number of pores with a comparatively large pore size of 100 Å or more and a large number of finely dispersed pores with a small pore size of less than 100 Å. The particles consist of small primary particles, which aggregate to form secondary particles. The average diameter of the primary particles is 0.01 to 0.1 ìm.

Due to the above-described morphological characteristics of the particles, the solid catalyst component of the present invention prepared by the propylene-ethylene block copolymerization, which consists of the propylene polymerization followed by the ethylene-propylene copolymerization, contains very small particles of the ethylene-propylene copolymer (the rubber component) produced during the ethylene-propylene copolymerization. The ethylene-propylene copolymer particles are scattered around the propylene polymer particles (or the matrix) and finely dispersed together with the propylene polymer particles. In addition, if the proportion of the rubber component is increased in the step of propylene-ethylene block copolymerization, the propylene polymer particles in the block copolymer are further micronized. The rubber component is formed between the micronized propylene polymer particles, whereby a propylene block copolymer containing the rubber component at a very high proportion can be produced. Furthermore, because the micronized extremely small particles of the rubber component are difficult to deposit on the surface of the polymer particles, the resulting polymer has excellent fluidity and is difficult to adhere.

Such a solid catalyst component is prepared by causing a magnesium compound, titanium halide, and electron donor compound to come into contact. A halogenated magnesium such as magnesium dichloride or an alkoxy magnesium is preferably used as the magnesium compound. As examples of dialkoxy magnesium, diethoxy magnesium, dipropoxy magnesium, dibutoxy magnesium, ethoxy propoxy magnesium, butoxy ethoxy magnesium, and the like can be given. Of these, magnesium dichloride and diethoxy magnesium are preferable. To prepare the solid catalyst component possessing the above-described particle characteristics, it is preferable that these magnesium compounds to be used as a carrier possess the same particle characteristics as the particles of the solid catalyst component mentioned above. Such a magnesium compound carrier can be prepared by various methods. In the case of magnesium dichloride or diethoxy magnesium, these compounds are first pulverized into fine particles by means of mechanical crushing or smashing using a vibration milling machine or a homogenizer, and then aggregated by spray dry or like means to produce carrier particles.

Diethoxy magnesium is particularly preferable among the above magnesium compounds. The bulk density of diethoxy magnesium is in the range of 0.20 to 0.40 g/ml, preferably 0.23 to 0.37 g/ml, and particularly preferably 0.25 to 0.35 g/ml. If the bulk density of diethoxy magnesium is less than 0.20 g/ml, polyolefin with a high bulk density and high stereoregularity cannot be obtained. If the bulk density is more than 0.40 g/ml, the properties of the resulting polyolefin particles are adversely affected. The bulk density is measured according to JIS K6721 (1977).

The pore volume of diethoxy magnesium is preferably in the range of 0.01 to 0.1 ml/g, more preferably 0.01 to 0.06 ml/g, and still more preferably 0.015 to 0.05 ml/g. When olefins are polymerized using the solid catalyst component prepared from porous diethoxy magnesium having a comparatively small pore volume of a specified range, polymers with high stereoregularity and excellent particle properties can be obtained at a high yield. In addition, in the case of block copolymerization, copolymers with excellent particle properties can be obtained at a high yield even if the copolymers contain a high proportion of rubber polymers.

The pore volume distribution of diethoxy magnesium represented by ln (R90/R10), wherein R90 is the particle radius at 90% of the integrated pore volume and R10 is the particle radius at 10% of the integrated pore volume, is 1.5 or more, preferably 1.5 to 3.5, and more preferably 2.0 to 3.0. Such a rather broad pore volume distribution is preferable. The pore volume distribution herein is measured by a nitrogen gas adsorption isotherm method.

The nitrogen adsorption specific surface area ($N_2SA$) of diethoxy magnesium is in the range of 5 to 50 $m^2/g$, preferably 10 to 40 $m^2/g$, and more preferably 15 to 30 $m^2/g$. The particles are preferably globular or oval, with a narrow distribution. The terms "globular or oval" as used with the shape of particles do not necessarily mean a perfect globular or oval shape with a smooth surface when observed by microscope, but may include particles having a ratio (1/w) of the major axis diameter (1) to the minor axis diameter (w) usually of 3 or less, preferably from 1 to 2, and more preferably. from 1 to 1.5. Therefore, diethoxy magnesium particles with a shape of potatoes having an irregular surface can be used. The solid catalyst component prepared from diethoxy magnesium particles with such a globular or oval shape also is in the form of globular or oval particles. Polyolefins produced using this solid catalyst component are also in the form of globular or oval particles, providing the polymer with excellent fluidity. This feature thus brings about an advantage to the polyolefin manufacturing process.

The average particle diameter of diethoxy magnesium is in the range of 1 to 100 $\mu$m, preferably 10 to 80 $\mu$m, and more preferably 15 to 60 $\mu$m. Diethoxy magnesium with an arrow particle distribution containing only a small amount of fine or coarse particles is preferably used. Specifically, the content of particles with a diameter of less than 5 $\mu$m should be less than 20 wt %, preferably less than 15 wt %, and more preferably less than 10 wt %, and particles with a particle diameter of more than 100 $\mu$m should be less than 10 wt %, and preferably less than 5 wt %. Moreover, the particle size distribution represented by (D90-D10)/D50, wherein D90 is the particle size at 90 wt % of the integrated particle size, D10 is the particle size at 10 wt % of the integrated particle size, and D50 is the particle size at 50 wt % of the integrated particle size, is 3 or less, preferably 2.5 or less, and more preferably 2 or less. It is possible to reduce fine particles of the resulting polyolefin by using dialkoxy magnesium containing a small amount of fine particles.

The following method, for example, is preferably used for the preparation of the diethoxy magnesium in the form of globular or oval particles having a larger bulk density, a specified pore volume, and a narrow particle size distribution containing only a small amount of fine or coarse particles.

A metal magnesium and ethanol are directly reacted in the absence of a solvent using a catalyst to produce diethoxy magnesium. In the reaction, the amount of metallic magnesium added to the reaction system consisting of the metal magnesium and ethanol, in terms of weight ratio to ethanol, is in the range of 1:9 to 1:15. This amount of metallic magnesium and ethanol is continuously or intermittently added to the ethanol reaction system over a period from 5 to 80 minutes. Then, the mixture is maintained for 1 to 30 hours while refluxing of ethanol to carry out an aging reaction.

The metal magnesium used in this method is preferably fine particles with a particle size of several ten to several hundred mesh, more specifically about 100 mesh, exhibiting excellent reactivity.

As the catalyst, an alkyl halide such as methyl bromide, methyl chloride, ethyl bromide, and ethyl chloride; a metal halide such as magnesium chloride and aluminum chloride; a dialkoxy magnesium such as diethoxy magnesium; iodine; and acetic esters can be used. Among these, iodine is preferable.

To prepare the solid catalyst component having the above-described average particle diameter, specific surface area, pore volume, and pore size distribution, it is important that in addition to the possession of the above characteristics the diethoxy magnesium be present as fine primary particles and secondary particles, with the secondary particles being formed from a number of the primary particles aggregated with a certain degree of force. The size of the primary particles is 0.01 to 0.1 μm. Such diethoxy magnesium can be obtained by suitably adjusting the preparation conditions. Smaller primary particles can be prepared by increasing the initial reaction speed. A specific means includes a method of increasing the amount of the catalyst used in the reaction of metallic magnesium and ethanol, for example, adding a catalyst such as iodine in the amount of 0.1 g or more, preferably 0.13 g or more, and particularly preferably 0.15 g or more for 1 g of the metallic magnesium, a method of increasing the rate of addition when the metallic magnesium and ethanol are continuously or intermittently added to the ethanol reaction system, and the like.

As specific examples of titanium halide, $TiCl_4$, $Ti(OCH_3)Cl_3$, $Ti(OC_2H_5)Cl_3$, $Ti(OC_3H_7)Cl_3$, $Ti(O\text{-}n\text{-}C_4H_9)Cl_3$, $Ti(OCH_3)_2Cl_2$, $Ti(OC_2H_5)_2Cl_2$, $Ti(OC_3H_7)_2Cl_2$, $Ti(O\text{-}n\text{-}C_4H_9)_2Cl_2$, $Ti(OCH_3)_3Cl$, $Ti(OC_2H_5)_3Cl$, $Ti(OC_3H_7)_3Cl$, $Ti(O\text{-}n\text{-}C_4H_9)_3Cl$, and the like can be given. Of these, $TiCl_4$ is preferably used. These tetravalent titanium halides may be used either individually or in combination of two or more.

The electron donor compound is an organic compound containing an oxygen atom or a nitrogen atom. Examples are alcohols, phenols, ethers, esters, ketones, acid halides, aldehydes, amines, amides, nitriles, isocyanates, organosilicon compounds containing an Si—O—C bond, and the like.

Specific examples include: alcohols such as methanol, ethanol, n-propanol, and 2-ethylhexanol; phenols such as phenol and cresol; ethers such as methyl ether, ethyl ether, propyl ether, butyl ether, amyl ether, diphenyl ether, 9,9-bis(methoxymethyl)fluorene, and 2-isopropyl-2-iso-pentyl-1,3-dimethoxypropane; monocarboxylic acid esters such as methyl formate, ethyl acetate, vinyl acetate, propyl acetate, octyl acetate, cyclohexyl acetate, ethyl propionate, ethyl butyrate, methyl benzoate, ethyl benzoate, propyl benzoate, butyl benzoate, octyl benzoate, cyclohexyl benzoate, phenyl benzoate, methyl p-toluate, ethyl p-toluate, methyl anisate, and ethyl anisate; dicarboxylic acid esters such as diethyl maleate, dibutyl maleate, dimethyl adipate, diethyl adipate, dipropyl adipate, dibutyl adipate, diisodecyl adipate, dioctyl adipate, and diester of phthalic acid; ketones such as acetone, methyl ethyl ketone, methyl butyl ketone, acetophenone, and benzophenone; acid halides such as phthalic acid dichloride and terephthalic acid dichloride; aldehydes such as acetaldehyde, propionaldehyde, octylaldehyde, and benzaldehyde; amines such asmethylamine, ethylamine, tributylamine, piperidine, aniline, and pyridine; amides such as oleic acid amide and stearic acid amide; nitriles such as acetonitrile, benzonitrile, and trinitrile; isocyanates such as methyl isocyanate and ethyl isocyanate; and organosilicon compounds containing an Si—O—C bond such as phenyl alkoxysilane, alkyl alkoxysilane, phenylalkyl alkoxysilane, cycloalkyl alkoxysilane, and cycloalkylalkyl alkoxysilane.

Of these electron donor compounds, esters, particularly aromatic dicarboxylic acid diesters are preferable, with phthalic acid diesters being ideal compounds. The following compounds can be given as specific examples of these phthalic acid diesters: dimethyl phthalate, diethyl phthalate, di-n-propyl phthalate, di-iso-propyl phthalate, di-n-butyl phthalate, di-iso-butyl phthalate, ethylmethyl phthalate, methyl(iso-propyl) phthalate, ethyl(n-propyl) phthalate, ethyl(n-butyl) phthalate, ethyl(iso-butyl) phthalate, di-n-pentyl phthalate, di-iso-pentyl phthalate, di-neo-pentyl phthalate, dihexyl phthalate, di-n-heptyl phthalate, di-n-octyl phthalate, bis(2,2-dimethylhexyl) phthalate, bis(2-ethylhexyl) phthalate, di-n-nonyl phthalate, di-iso-decyl phthalate, bis(2,2-dimethylheptyl) phthalate, n-butyl(iso-hexyl) phthalate, n-butyl(2-ethylhexyl) phthalate, n-pentylhexyl phthalate, n-pentyl(iso-hexyl) phthalate, iso-pentyl(heptyl) phthalate, n-pentyl (2-ethylhexyl) phthalate, n-pentyl (iso-nonyl) phthalate, iso-pentyl (n-decyl) phthalate, n-pentylundecyl phthalate, iso-pentyl(iso-hexyl) phthalate, n-hexyl(2,2-dimethylhexyl) phthalate, n-hexyl (2-ethylhexyl) phthalate, n-hexyl (iso-nonyl) phthalate, n-hexyl(n-decyl) phthalate, n-heptyl (2-ethylhexyl) phthalate, n-heptyl (iso-nonyl) phthalate, n-heptyl (neo-decyl) phthalate, and 2-ethylhexyl(iso-nonyl) phthalate. These compounds may be used either individually or in combination of two or more. The above ester compounds are preferably used in combination of two or more. In this instance, esters are combined so that the total carbon atom number in the alkyl group possessed by one ester may differ 4 or more from that possessed by other esters.

A phthalic acid diester in which one or two hydrogen atoms on the aromatic ring are replaced by an alkyl group having 1 to 5 carbon atoms or a halogen atom such as a chlorine, bromine, or fluorine can also be preferably used. As specific examples, dineopentyl 4-methylphthalate, dineopentyl 4-ethylphthalate, dineopentyl 4,5-dimethylphthalate, dineopentyl 4,5-diethyl phthalate, diethyl 4-chlorophthalate, di-n-butyl 4-chloro phthalate, di-iso-butyl 4-chlorophthalate, di-iso-hexyl 4-chlorophthalate, di-iso-octyl 4-chlorophthalate, diethyl 4-bromophthalate, di-n-butyl 4-bromophthalate, di-iso-butyl 4-bromophthalate, di-iso-hexyl 4-bromophthalate, di-iso-octyl 4-bromophthalate, di-iso-neopentyl 4-bromophthalate, diethyl 4,5-dichlorophthalate, di-n-butyl 4,5-dichloro phthalate, di-iso-hexyl 4,5-dichlorophthalate, di-iso-octyl 4,5-dichlorophthalate, and the like can be given.

The solid catalyst component is prepared by causing the magnesium compound, halogenated titanium compound, and electron donor compound to come into contact. Although the contact may be carried out in the absence of an inert organic solvent, the presence of such a solvent is preferable for ease of processing. As inert organic solvents used here, saturated hydrocarbons such as hexane, heptane, and cyclohexane, aromatic hydrocarbons such as benzene, toluene, xylene, and ethylbenzene, halogenated hydrocarbons such as orthodichlorobenzene, methylene chloride, carbon tetrachloride, and dichloroethane, can be given. Of these, aromatic hydrocarbons that are liquid at an ordinary temperature with a boiling point of about 90 to 150° C., specifically toluene, xylene, and ethylbenzene are preferably used. Contact of these components is carried out in a vessel equipped with a stirrer in an inert gas atmosphere from which water and the like have been removed while stirring. When the components come into contact by stirring the mixture or when a denaturing treatment is carried out by dispersing or suspending the components, the mixture is stirred at a comparatively low temperature of around room temperature. When a reaction product is to be obtained by reacting the components after the contact, the stirring is preferably carried out at a temperature range of 40 to 130° C. The reaction does not sufficiently proceed at a reaction temperature below 40° C., resulting in a solid catalyst component with inadequate properties. On the other hand, control of the reaction becomes difficult at a temperature above 130° C. due to vaporization of the solvent and the like. The reaction time. is one minute or more, preferably ten minutes or more, and still more preferably 30 minutes or more. When the above-mentioned specific magnesium compound is used as the carrier, the solid catalyst component must be prepared by causing the magnesium compound to come into contact with the titanium halide compound and electron donor compound, while maintaining the particle characteristics. In particular, when diethoxy magnesium is used, a rapid halogenation reaction takes place if the diethoxy magnesium is brought into contact with a titanium halide compound such as titanium tetrachloride at a temperature of above 0° C., generating heat that may destroy the particles of diethoxy magnesium. As a result, even the primary particle unit is destroyed yielding a fine powder. Therefore, an adequate care must be taken to remove the heat of the reaction during an early stage of the catalytic reaction. Cooling the reaction system to 0° C. or lower is a sufficient method.

The following method can be given as an example of a preferable method for preparing the solid catalyst component. For example, a suspension is prepared by suspending dialkoxy magnesium in an aromatic hydrocarbon compound such as toluene that is liquid at an ordinary temperature. Next, this suspension is added to titanium tetrachloride while maintaining a low reaction temperature. The temperature is preferably from −15 to 5° C., and more preferably from −10 to 0° C. After the addition, the reaction system is marinated at a lower temperature, preferably from −15 to 5° C., and more preferably from −10 to 0° C., thereby allowing the mixture to age. The mixture is then heated and reacted at 70 to 120° C. In this instance, an electron donor compound such as a phthalic acid diester comes into contact with the suspension at a temperature from −20 to 130° C., either before or after the titanium tetrachloride is contacted, thereby obtaining a solid reaction product. After washing the solid reaction product with an aromatic hydrocarbon compound that is liquid at an ordinary temperature, titanium tetrachloride is again added in the presence of an aromatic hydrocarbon compound to carry out the catalytic reaction at 70 to 120° C. The resulting product is washed with a hydrocarbon compound that is liquid at an ordinary temperature to obtain the solid catalyst component. Repeated contact with titanium tetrachloride is a preferable embodiment for improving the catalyst activity.

The ratio of the compounds used for the preparation of the solid catalyst component cannot be generically defined, because such a ratio varies according to the process employed. For example, the titanium halide compound is used in the amount from 0.5 to 100 mols, preferably from 0.5 to 50 mols, still more preferably from 1 to 10 mols and the electron donor compound is used in the amount from 0.01 to 10 mols, preferably from 0.01 to 1 mol, and still more preferably from 0.02 to 0.6 mol for one mol of the magnesium compound.

The compounds represented by the above formula (1) can be given as the organoaluminum compound (B) (hereinafter referred to from time to time simply as "component (B)") which can be used for preparing the solid catalyst composition for the polymerization of olefins in the present invention. As specific examples of such organoaluminum compounds (B), triethyl aluminum, diethyl aluminum chloride, tri-iso-butyl aluminum, diethyl aluminum bromide, and diethyl aluminum halide can be given. These compounds may be used either individually or in combination of two or more. Triethyl aluminum and tri-iso-butyl aluminum are preferably used.

In addition to the above components, an external electron donor compound(hereinafter referred to from time to time simply as "component (C)") may be used for preparing the solid catalyst component for polymerization of olefins in the present invention. As the external electron donor compound, the same electron donor compounds for forming the solid catalyst component mentioned above can be used. Particularly preferable compounds for this purpose are ethers such as 9,9-bis(methoxymethyl)fluorine and 2-isopropyl-2-isopentyl-1,3-dimethoxypropane; esters such as methyl benzoate and ethyl benzoate; and organosilicon compounds.

As organosilicon compounds used as the external electron donor compound (C), compounds of the following formula (5) can be given:

$$R^2_q Si(OR^3)_{4-q} \qquad (5)$$

wherein $R^2$ individually represents an alkyl group having 1 to 12 carbon atoms, a cycloalkyl group, a phenyl group, a vinyl group, an allyl group, or an aralkyl group, $R^3$ individually represents an alkyl group having 1 to 4 carbon atoms, a cycloalkyl group, a phenyl group, a vinyl group, an allyl group, or an aralkyl group, $R^2$ and $R^3$ being either the same or different; and q is an integer satisfying the formula $0 \leq q \leq 3$.

As examples of such an organosilicon compound, phenyl alkoxysilane, alkyl alkoxysilane, phenylalkyl alkoxysilane, cycloalkyl alkoxysilane, and cycloalkylalkyl alkoxysilane can be given.

The following compounds can be given as specific examples of such organosilicon compounds: trimethyl methoxysilane, trimethyl ethoxysilane, tri-n-propyl methoxysilane, tri-n-propyl ethoxysilane, tri-n-butyl methoxysilane, tri-iso-butyl methoxysilane, tri-t-butyl methoxysilane, tri-n-butyl ethoxysilane, tricyclohexyl methoxysilane, tricyclohexyl ethoxysilane, cyclohexyldimethyl methoxysilane, cyclohexyl diethyl methoxysilane, cyclohexyl diethylethoxysilane, dimethyl dimethoxysilane, dimethyl diethoxysilane, di-n-propyl dimethoxysilane, di-iso-propyl dimethoxysilane, di-n-propyl diethoxysilane, di-iso-propyl diethoxysilane, di-n-butyl dimethoxysilane, di-iso-butyl dimethoxysilane, di-t-butyl dimethoxysilane, di-n-butyl diethoxysilane, n-butylmethyl dimethoxysilane, bis(2-ethylhexyl) dimethoxy silane, bis(2-ethylhexyl) diethoxysilane, dicyclopentyl dimethoxysilane, dicyclopentyl diethoxysilane, dicyclohexyl dimethoxysilane, dicyclohexyl diethoxysilane, bis(3-methyl cyclohexyl) dimethoxysilane, bis(4-methylcyclohexyl) dimethoxysilane, bis(3,5-dimethylcyclohexyl) dimethoxysilane, cyclohexylcyclopentyl dimethoxysilane, cyclohexylcyclopentyl diethoxysilane, cyclohexylcyclopentyl dipropoxysilane, 3-methylcyclohexylcyclopentyl dimethoxysilane, 4-methyl cyclohexylcyclopentyl dimethoxysilane, 3,5-dimethyl cyclohexylcyclopentyl dimethoxysilane, 3-methylcyclohexyl cyclohexyl dimethoxysilane, 4-methylcyclohexylcyclohexyl dimethoxysilane, 3,5-dimethylcyclohexylcyclohexyl dimethoxy silane, cyclopentylmethyl dimethoxysilane, cyclopentylmethyl diethoxysilane, cyclopentylethyl diethoxysilane, cyclopentyl (iso-propyl) dimethoxysilane, cyclopentyl(iso-butyl) dimethoxysilane, cyclohexylmethyl dimethoxysilane, cyclo hexylmethyl diethoxysilane, cyclohexylethyl dimethoxysilane, cyclohexylethyl diethoxysilane, cyclohexyl(n-propyl) dimethoxysilane, cyclohexyl(iso-propyl) dimethoxysilane, cyclohexyl(n-propyl) diethoxysilane, cyclohexyl(iso-butyl) dimethoxysilane, cyclohexyl(n-butyl) diethoxysilane, cyclo hexyl(n-pentyl) dimethoxysilane, cyclohexyl(n-pentyl) diethoxysilane, diphenyl dimethoxysilane, diphenyl diethoxy silane, phenylmethyl dimethoxysilane, phenylmethyl diethoxy silane, phenylethyl dimethoxysilane, phenylethyl diethoxy silane, methyl trimethoxysilane, methyl triethoxysilane, ethyl trimethoxysilane, ethyl triethoxysilane, n-propyl trimethoxysilane, iso-propyl trimethoxysilane, n-propyl triethoxysilane, iso-propyl triethoxysilane, n-butyl trimethoxysilane, iso-butyl trimethoxysilane, t-butyl trimethoxysilane, n-butyl triethoxysilane, 2-ethylhexyl trimethoxysilane, 2-ethylhexyl triethoxysilane, cyclopentyl trimethoxysilane, cyclopentyl triethoxysilane, cyclohexyl trimethoxysilane, cyclohexyl triethoxysilane, vinyl tri methoxysilane, vinyl triethoxysilane, phenyltrimethoxysilane, phenyltriethoxysilane, tetramethoxysilane, tetraethoxysilane, tetrapropoxysilane, and tetrabutoxysilane. of these, preferable compounds are di-n-propyl dimethoxysilane, di-iso-propyl dimethoxysilane, di-n-butyl dimethoxysilane, di-iso-butyl dimethoxysilane, di-t-butyl dimethoxysilane, di-n-butyl diethoxysilane, t-butyl trimethoxysilane, dicyclohexyl dimethoxysilane, dicyclohexyl diethoxysilane, cyclohexyl methyl dimethoxysilane, cyclohexylmethyl diethoxysilane, cyclohexylethyl dimethoxysilane, cyclohexylethyl diethoxy silane, dicyclopentyl dimethoxysilane, dicyclopentyl diethoxysilane, cyclopentylmethyl dimethoxysilane, cyclo pentylmethyl diethoxysilane, cyclopentylethyl diethoxysilane, cyclohexylcyclopentyl dimethoxysilane, cyclohexylcyclopentyl diethoxysilane, 3-methylcyclohexylcyclopentyl dimethoxy silane, 4-methylcyclohexylcyclopentyl dimethoxysilane, and 3,5-dimethylcyclohexylcyclopentyl dimethoxysilane. Either one type of these organosilicon compounds (C) or a combination of two or more types of these compounds can be used in the present invention.

The olefin polymerization catalyst of the present invention comprises the above-described component (A), component (B), and component (C). Polymerization or copolymerization of olefins is carried out in the presence of this catalyst. As olefins, ethylene, propylene, 1-butene, 1-pentene, 4-methyl-1-pentene, vinyl cyclohexane, and the like can be used either individually or in combination of two or more. Of these, ethylene, propylene, and 1-butene can be suitably used, with a particularly preferable olefin being propylene. The olefin polymerization catalyst of the present invention is suitable for use in the copolymerization, in particular block copolymerization, of propylene and other olefins. As copolymerized olefins, ethylene, 1-butene, 1-pentene, 4-methyl-1-pentene, vinyl cyclohexane, and the like can be used either individually or in combination of two or more. Of these, ethylene and 1-butene can be suitably used.

The ratio of the components (A) to (C) is not specifically limited inasmuch as such a ratio does not influence the effect of the present invention. Usually, the organoaluminum compound (B) is used in the amount of 1 to 2,000 mols, and preferably 50 to 1,000 mols, per one mol of titanium atom in the solid catalyst component (A). The external electron donor compound (C) is used in the amount of 0.002 to 10 mols, preferably 0.01 to 2 mols, and more preferably 0.01 to 0.5 mols, per one mol of the organoaluminum compound (B).

Although the order of contact of these components is optional, it is desirable to first add the organoaluminum compound (B) to the polymerization system, then add external electron donor compound (C) to come in contact with the organoaluminum compound (B), and add the solid catalyst component (A) to come in contact with the resulting mixture.

The polymerization can be carried out either in the presence or absence of an organic solvent. Olefin monomers such as propylene may be used either in a gaseous or liquid state. The polymerization reaction is preferably carried out at a temperature of 200° C. or less, and preferably at 100° C. or less, under a pressure of 10 MPa or less, and preferably 5 MPa or less. Either a continuous polymerization system or a batch polymerization system may be used for the polymerization reaction. In addition, the polymerization can be completed either in one step or in two or more steps.

In polymerizing olefins using the above catalyst, it is desirable to preliminarily polymerize the olefins prior to the main polymerization reaction to improve the catalytic activity, stereoregularity, properties of resulting polymer particles, and the like. In addition to the olefins used in the main polymerization reaction, monomers such as styrene can be used in the preliminary polymerization. Although the order of contact of the components and monomers in carrying out the preliminary polymerization is optional, it is desirable to first add the organoaluminum compound (B) to the preliminary polymerization system in an inert, gas or in the atmosphere of olefin gas to be polymerized such as propylene, add the solid catalyst component (A), and then add an olefin such as propylene and/or one or more other olefins. When the preliminary polymerization is carried out in combination with the organosilicon compound (C), it is desirable to first add the organoaluminum compound (B) to the preliminary polymerization system in an inert gas or in the atmosphere of an olefin gas to be polymerized such as propylene, second add the organosilicon compound (C), then add the solid catalyst component (A), and finally add an olefin such as propylene and/or one or more other olefins to the mixture.

For manufacturing a propylene block copolymer, two or more polymerization steps are carried out, wherein usually propylene is polymerized in the first step in the presence of the polymerization catalyst, then ethylene and propylene are copolymerized in the second step. It is possible to cause an α-olefin other than propylene to be present or to cause such an α-olefin to homo-polymerize in the second step or after the second step. As an α-olefin, ethylene, 1-butene, 4-methyl-1-pentene, vinyl cyclohexane, 1-hexene, 1-octene, and the like can be given. Specifically, the polymerization temperature and polymerization time are adjusted so that a polymer with the content of polypropylene portions of 20 to 80 wt % can be obtained in the first step; then in the second step ethylene and propylene or other á-olefins are introduced and polymerized to obtain a polymer with the content of rubber portions of 20 to 80 wt %. The polymerization is preferably carried out at a temperature of 200° C. or less, and preferably at 100° C. or less, under a pressure of 10 MPa or less, and preferably 5 MPa or less in both the first and second steps. The polymerization time in each step, or the residence time in the case of continuous polymerization, is usually from 1 minute to 5 hours. As the method of polymerization, slurry polymerization using an inert hydrocarbon solvent such as cyclohexane or heptane, bulk polymerization using a solvent such as liquefied propylene, and vapor phase polymerization that is carried out substantially in the absence of a solvent can be given. The bulk polymerization and vapor phase polymerization are preferable.

The propylene block copolymer of the present invention is a block copolymer comprising 20 to 80 wt %, and preferably 30 to 70 wt % of a propylene polymer (hereinafter referred to from time to time as "PP portion") and 20 to 80 wt %, and preferably 30 to 70 wt % of an ethylene-propylene copolymer (hereinafter referred to from time to time as "rubber portion"), wherein amorphous ethylene-propylene copolymer sections (hereinafter referred to from time to time as "rubber sections") are finely dispersed in the propylene polymer. In other words, the propylene polymer and the ethylene-propylene copolymer are entangled with each other, forming amorphous propylene polymer sections and amorphous ethylene-propylene copolymer sections (hereinafter referred to from time to time as "PP sections"), wherein when the rubber sections are converted into a circle with the same area, such a circle has an average diameter (Dr) satisfying the above-described formula (2), and preferably the following formula (6), $$0.02 \leq Dr(\mu m) \leq 0.0045 \times A \quad (6)$$

wherein A is the same as defined above, and more preferably the following formula (7), $$0.02 \leq Dr(\mu m) \leq 0.004 \times A \quad (7)$$

wherein A is the same as defined above.

In addition, in the propylene block copolymer of the present invention, it is preferable that the diameter of the particles at 90% of the accumulative particle diameter distribution of the ethylene-propylene copolymer sections (Dr90) satisfy the following formula (4), $$Dr90(\mu m) \leq 0.01 \times A \quad (4)$$

wherein A is the same as defined above, and more preferably the following formula (8), $$0.05 \leq Dr90(\mu m) \leq 0.01 \times A \quad (8)$$

wherein A is the same as defined above.

Figure 2:
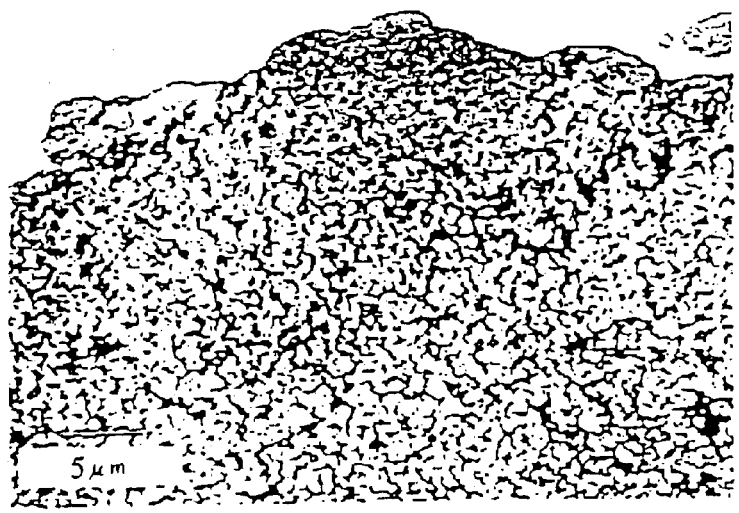
FIG. 2 is a TEM (Transmission Electron Microscope) photograph of the section of the propylene block copolymer prepared in Example 1.
Figure 3:
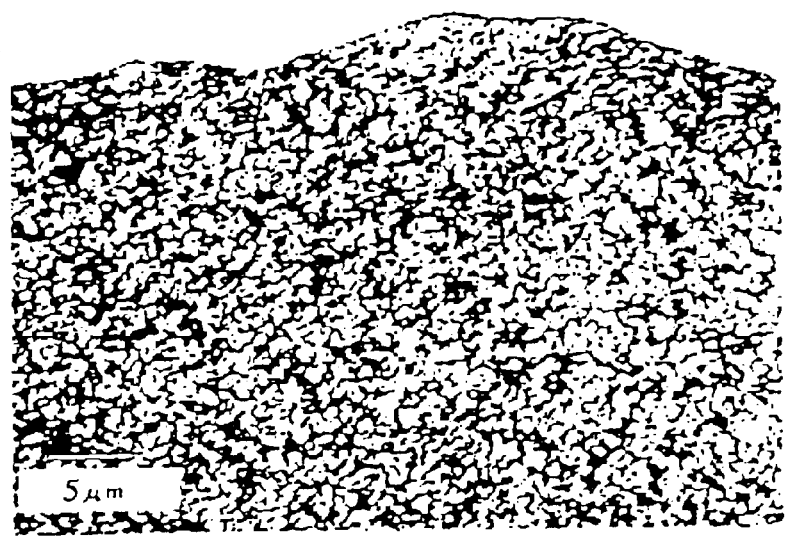
FIG. 3 is a TEM (Transmission Electron Microscope) photograph of the section of the propylene block copolymer prepared in Example 2.

FIGS. 2 and 3 are section TEM (transmission electron microscope) photographs of the propylene block copolymers of the present invention, wherein FIG. 2 shows the section TEM photograph of the propylene block copolymer containing 72.1 wt % of PP portion and 27.9 wt % of rubber portion, and FIG. 3 shows the section TEM photograph of the propylene block copolymer containing 36.5 wt % of PP portion and 63.5 wt % of rubber portion. As can be seen in these photographs, in the propylene block copolymer of the present invention very small amorphous rubber sections (black portions) are finely or highly dispersed in the PP portions (white portions), or the PP portions and rubber portions are entangled with each other. When the amount of the PP portions is large, dispersion of the rubber sections in the matrix of the PP portions are observed scattered like small cracks or islands in the matrix. When the amount of the rubber portions is large, dispersion of the PP sections in the matrix of the rubber portions observed scattered like small cracks or islands in the matrix. When the proportion of the PP portions and the rubber portions is more close, for example, when the proportion is 30 to 70 wt %:70 to 30 wt %, it is difficult to identify which is the matrix phase or the dispersing phase in the photographs wherein fine amorphous materials are mixed (see FIGS. 2 and 3).

In the present invention, a rubber section indicates one unit of amorphous (an undefined form including a particle or thread) rubber portion finely dispersed in the PP portion. An independent rubber section is counted as one unit. When a multitude of sections form a continuous part, an area with a minimum width of less than 0.01 $\mu$m is deemed as one unit of PP section. In the determination of the average diameter, the image of the TEM photograph of the copolymer section is analyzed to calculate the section area of each rubber portion, and the calculated area is converted into the diameter of the circle which is equal to that area.

The rubber portions may include a crystalline ethylene polymer. When the rubber portions are formed from the crystalline ethylene polymer and ethylene-propylene copolymer rubber, the amount of crystalline ethylene polymer in the rubber portions is in the range of 1 to 80 wt %, and preferably 10 to 50 wt %, with the balance being the ethylene-propylene copolymer rubber.

In addition, in the propylene block copolymer of the present invention, the average diameter (Dpp) of the propylene polymer section (hereinafter referred to from time to time as "PP section") satisfies the following formula (3), $$5.0 \geq Dpp \geq e^{-0.02 \times A} \quad (3)$$

wherein A is the same as defined above.

In the present invention, the PP section indicates one particle unit, around which amorphous (an undefined form including a particle or thread) rubber portions are present. An independent PP section is counted as one unit. When a multitude of sections form a continuous part, an area with a minimum width of less than 0.2 $\mu$m is deemed as one unit of rubber portion. In the determination of the average diameter, the image of the TEM photograph of the polymer section is analyzed to calculate the section area of each PP portion, and the calculated area is converted into the diameter of the circle which is equal to that area.

In this manner, the average diameter of the PP sections that are PP particles decreases as the proportion of the rubber portion (a block ratio) increases. Thus, the structure of the propylene block copolymer of the present invention basically differs from conventional propylene block copolymers. The PP portions of the conventional propylene block copolymers could not be identified as a PP section, but are basically in the form of a continuous matrix having pores in which the rubber portions are present. However, the propylene block copolymer of the present invention forms units of PP sections, each having a very small average diameter (or volume), particularly when the proportion of rubber portions exceeds 50 wt %. Rubber portions that are amorphous or in an undefined form, including particles and threads having a very small diameter, are present around or inside the PP sections.

The average diameter of the PP sections in the propylene block copolymer of the present invention is 0.5 to 20 times, preferably 1.0 to 15 times, and particularly preferably 3.0 to 12 times average diameter of the rubber sections. The average diameter of the PP sections in the propylene block copolymer varies according to the proportion of rubber portions. The average diameter of the PP sections in the propylene block copolymer varies according to the proportion of rubber portions. As the proportion of the rubber portions increases, the average diameter of the PP sections decreases and, conversely, the average diameter of the rubber sections increases. Specifically, PP particles become fine as the proportion of the rubber portions increases. Because the rubber portions can be finely dispersed in the PP portions in this manner, it is possible to increase the rubber portions to 50% or more. Even in the case where the proportion of the rubber portions exceeds 50%, the rubber portions do not deposit on the surface of polymer particles, the polymer particles do not exhibit adhesion, and flowability can be maintained.

Desirable characteristics of the propylene block copolymer of the present invention are shown in Table 2. In Table 2, "MFR" indicates a melt flow rate and "($\eta$)" indicates a limiting viscosity.

TABLE 2

|  | PP portion | Rubber portion |
| --- | --- | --- |
| MFR (g/10 minutes) | 0.1 to 500 | — |
| ($\eta$) | — | 1.0 to 20 |
| Xylene soluble (wt %) | — | 15 to 70 |
| Ethylene content (wt %) | — | 10 to 90 |
| Xylene insoluble (wt %) | 30 to 85 | 20 to 80 |

The propylene block copolymer of the present invention is in the form of particles having an average diameter of 100 to 5,000 $\mu$m. The amount of the ethylene-propylene copolymer that deposits onto the surface of the particles is 0.3 vol % or less, preferably 0.2 vol % or less, and particularly preferably 0.1 vol % or less of the total ethylene-propylene copolymer. This very small amount of rubber portions that are present on the surface of copolymer particles is another feature of the present invention. In the conventional propylene block copolymer or in the conventional manufacturing process, the rubber portions form inside the polymer particles or the matrix of the PP portions and do not deposit on the surface if the proportion of the rubber portions is very small. However, if the proportion of the rubber portions is large, PP portions crack causing the rubber portions to deposit on the surface of the polymer. For this reason, the polymer particles exhibit adhesiveness, causing aggregation of the polymer particles due to adhesion among the particles which causes trouble in transportation pipes and the like due to adhesion of the polymer particles to the inner wall of the reaction vessel or the inner surface of the pipes. In the propylene block copolymer of the present invention, only a very small amount of rubber portions is present on the surface of the polymer particles even if the proportion of rubber portions is 50 wt % or more. The propylene block copolymer of the present invention thus exhibits almost no adhesive properties. The proportion of rubber portions deposited on the surface of the polymer particles is determined by the image analysis of the TEM photograph of the copolymer section. The area of the rubber portions deposited on the surface of the polymer particles and the area of the total rubber portions are converted into the volume, based on which the proportion of rubber portions in the surface can be calculated.

EXAMPLES

The present invention will be described in more detail by way of examples, which are explained in comparison with comparative examples.

Properties of polymers were evaluated according to the following methods.

Melt Index (the Value of Melt Flow Rate (MFR))

The melt index was measured according to ASTM D1238.

Flexural Modulus

After the addition of a heat resistant stabilizer, the polymer was palletized using an extruder. The pellets were formed into a measuring object using an injection-molding machine. The flexural modulus of the formed object was measured at 23° C. according to ASTM D790.

Izod Impact Strength

After the addition of a heat resistant stabilizer, the polymer was palletized using an extruder. The pellets were formed into a measuring object using an injection-molding machine. The izod impact strength of the injection-molded object with notches was measured at 23° C. according to ASTM D256.

Composition of Propylene Block Copolymer

The proportion of rubber portions (the block rate), proportion of rubber portions on the surface, average diameter of PP sections, average diameter of rubber sections, particle diameter at 90% of the accumulative particle diameter distribution in the rubber sections, and Dpp/Dr were analyzed using a transmission electron microscope (H-7100FA, manufactured by Hitachi, Ltd.) and an image data processing apparatus (LUZEX F-type, manufactured by Nireco Corp.). The MFR was measured according to ASTM D1238. The xylene insoluble in the PP portions was measured by the following method. 4.0 g of a polymer was added to 200 ml of p-xylene and dissolved while maintaining the mixture at the boiling point (138° C.) over two hours. The mixture was cooled to 23° C. and the soluble matters were separated from insoluble matters by filtration. The soluble matters were dried with heating and the weight of the polymer thus obtained was determined as xylene soluble (wt %).

Ethylene Content, EPR Content

The ethylene content of the propylene block copolymer was determined by $^{13}$C-NMR. The content of ethylene-propylene rubber (EPR) in the propylene block copolymer was determined by the following method. A 1 l flask equipped with a stirrer and a cooling tube was charged with 2.5 g of a copolymer, 8 mg of 2,6-di-t-butyl-p-cresol, and 250 ml of p-xylene. The mixture was stirred at boiling point until the copolymer was completely dissolved. The flask was cooled to room temperature and allowed to stand for 15 hours to cause the solid components to precipitate. The solid components were separated from the liquid phase by centrifugation and placed in a beaker, and 500 ml of acetone was added. After stirring for 15 hours at room temperature, the solid components were filtered and dried. The weight was measured (this weight is indicated as "B"). The separated liquid phase was processed in the same manner to precipitate solid components. The weight of the precipitated solid components was measured (this weight is indicated as "C"). The content (wt %) of ethylene-propylene component (EPR) in the copolymer was determined by the formula $C(g)/[B(g)+C(g)]\times 100$.

Flowability of Propylene Block Copolymer

Figure 4:
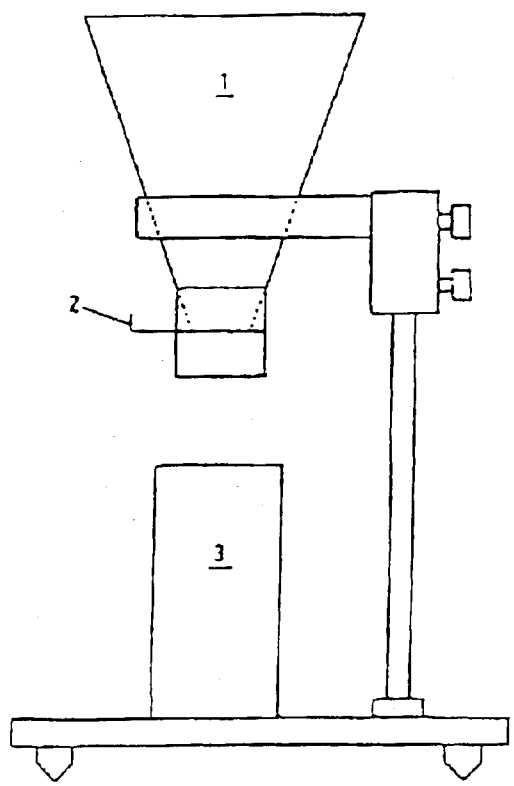
FIG. 4 is a drawing of an apparatus for measuring fluidity of a propylene block copolymer.

An apparatus equipped with a funnel 1 installed on the top, having a dumper 2 attached in the discharge opening, and a receptacle 3 (internal diameter: 40 mm, height: 81 mm) installed 38 mm below the dumper 2 as shown in FIG. 4 was used. The funnel had the following dimensions: the upper opening diameter: 91 mm, opening diameter at the dumper position: 8 mm, angle of inclination: 200, height to the dumper position: 114 mm. The funnel 1 was charged with 50 g of a polymer and the dumper 2 was opened causing the polymer to drop into the receptacle 3. The time required for all of the polymer to drop was measured. The experiment was carried out using a propylene block copolymer and a propylene homopolymer produced using the same solid catalyst component as used for the polymerization of the propylene block copolymer (i.e. the polymer obtained by the polymerization reaction using only propylene in the preparation of the propylene block copolymer in Example 1) to determine the time required for the polymers to drop (respectively T1 and T2). The flowability was indicated by the ratio T1/T2.

Example 1

<Preparation of Diethoxy Magnesium>

100 g of iodine was dissolved in 1,000 ml of ethanol. The solution was heated and boiled while refluxing. A slurry of metallic magnesium and ethanol was continuously added to the mixture over two hours, whereby the total 500 g of metallic magnesium was added while reacting the mixture under reflux. The amount of ethanol added was 7.6 l. After aging for 3 hours, the resulting solid product was washed with ethanol and dried to obtain diethoxy magnesium powder. The diethoxy magnesium was analyzed to find the following properties: bulk density: 0.31 g/ml, specific surface area ($N_2SA$): 19.8 m$^2$/g, sphericity (1/w): 1.10, average particle diameter: 25 ìm, pore volume: 0.02 ml/g, pore size distribution [ln(R90/R10)]: 2.30, content of particles with 5 μm or less diameter: 5%, particle size distribution [(D90-D10)/D50]: 1.05.

<Preparation of Solid Catalyst Component>

A 2,000 ml round bottom flask equipped with a stirrer, of which the internal atmosphere had been sufficiently replaced by nitrogen gas, was charged with 150 g of the above diethoxy magnesium, 750 ml of toluene, and 54 ml of di-n-butyl phthalate to prepare a suspension. The suspension was continuously added over one hour to a solution of 450 ml of toluene and 300 ml of titanium tetrachloride in a 3,000 ml round bottom flask equipped with a stirrer, of which the internal atmosphere had been sufficiently replaced by nitrogen gas. In this instance, the reaction system was maintained at –5° C. The above mixed solution was stirred for one hour while maintaining the temperature at –5° C. Then, the temperature was raised to 100° C. in 4 hours, followed by reacting it for 2 hours with stirring. After the reaction, the product was subjected to a catalytic reaction for two hours while stirring at 80° C. The resulting reaction mixture was washed seven times with heptane at 40° C., filtered, and dried to obtain a solid catalyst component in the form of a powder. The content of titanium in the solid catalyst component was analyzed and found to be 3.15 wt %. The average particle diameter, specific surface area, pore volume, and pore size distribution of the solid catalyst component were measured. The results are shown in Table 3.

<Preparation of Propylene Block Copolymer>

A 2.0 l autoclave equipped with a stirrer, of which the internal atmosphere had been entirely replaced by nitrogen gas, was charged with triethylaluminum (TEAL), cyclohexylmethyl dimethoxysilane (CMDMS), and the above solid catalyst component in an amount, in terms of the titanium atom contained therein, of 0.0026 mmol, thereby forming a polymerization catalyst. The mol ratio of Ti:TEAL:CMDMS in the solid catalyst component was 1:400:67. Then, with the addition of 2.0 l of hydrogen gas and 1.2 l of liquefied propylene, polymerization of propylene was carried out for one hour at 70° C. to obtain a polymer with a proportion of PP portion of about 70 wt %. Next, a mixed gas of ethylene and propylene at a molar ratio of 0.7:1 was supplied for two hours to continue the reaction under the pressure of 1.7 MPa at 70° C. to obtain a propylene block copolymer with a rubber portion content of about 30 wt %. The TEM (transmission electron microscope) photograph of the resulting propylene block copolymer is shown in FIG. 2. The proportion of rubber portions (the block rate), proportion of rubber portions on the surface, ethylene content, EPR content, PP portion MFR, PP portion xylene insoluble matters, average diameter of PP sections, average diameter of rubber sections, particle diameter at 90% of the accumulative particle diameter distribution in the rubber sections, Dpp/Dr, MI, flexural modulus of elasticity, and Izod impact strength are shown in Table 3. The PP portion MFR and PP portion xylene insoluble matters are based on the results of measurement on the reaction product after the propylene polymerization.

Example 2

<Preparation of Propylene Block Copolymer>

A propylene block copolymer was prepared in the same manner as in Example 1, except that to obtain a polymer with a rubber portion content of 63.5 wt %, propylene polymerization was carried out at 70° C. for 0.5 hour and ethylene-propylene copolymerization was carried out at 70° C. for 2 hours. The TEM (transmission electron microscopy) photograph of the propylene block copolymer is shown in FIG. 3 and the same properties as those given in Example 1 are shown in Table 3.

Example 3

<Preparation of Diethoxy Magnesium>

100 g of iodine was dissolved in 1,000 ml of ethanol. The solution was heated and boiled while refluxing. A slurry of metallic magnesium and ethanol were continuously added to the mixture over one hour, whereby the total 500 g of metallic magnesium was added while reacting the mixture while refluxing. The amount of ethanol added was 7.6 l. After aging for 3 hours, the resulting solid product was washed with ethanol and dried to obtain diethoxy magnesium powder. The diethoxy magnesium was analyzed to find the following properties: bulk density: 0.30 g/ml, specific surface area ($N_2SA$): 20.5 m$^2$/g, sphericity (l/w): 1.05, average particle diameter: 24 μm, pore volume: 0.018 ml/g, pore size distribution [ln(R90/R10)]: 2.10 content of particles with 5 μm or less diameter: 5%, particle size distribution [(D90-D10)/D50]: 1.05.

<Preparation of Solid Catalyst Component and Propylene Block Copolymer>

A solid catalyst component and a propylene block copolymer were prepared in the same manner as in Example 1, except for using the diethoxy magnesium prepared above. The results are shown in Table 3.

Example 4

<Preparation of Solid Catalyst Component>

A 2,000 ml round bottom flask equipped with a stirrer, of which the internal atmosphere had been sufficiently replaced by nitrogen gas, was charged with 150 g of the diethoxy magnesium prepared in Example 1, 750 ml of toluene, and 54 ml of di-n-butyl phthalate to prepare a suspension. The suspension was continuously added over one hour to a solution of 450 ml of toluene and 300 ml of titanium tetrachloride in a 3,000 ml round bottom flask equipped with a stirrer, of which the internal atmosphere had been sufficiently replaced by nitrogen gas. In this instance, the reaction system was maintained at −8° C. The above mixed solution was stirred for one hour while maintaining the temperature at −8° C. Then, the temperature was raised to 100° C. in 4 hours, followed by reacting it for 2 hours with stirring. After the reaction, the product was subjected to a catalytic reaction for two hours while stirring at 80° C. The resulting reaction mixture was washed seven times with heptane at 40° C., filtered, and dried to obtain a solid catalyst component in the form of a powder. The content of titanium in the solid catalyst component was analyzed and found to be 3.15 wt %. The average particle diameter, specific surface area, pore volume, and pore size distribution of the solid catalyst component were measured. The results are shown in Table 3.

<Preparation of Propylene Block Copolymer>

A propylene block copolymer was prepared in the same manner as in Example 1, except for using the solid catalyst component prepared above. The results are shown in Table 3.

Comparative Example 1

A ball mill with a volume of about 10 l, of which the internal atmosphere had been replaced with nitrogen gas, was charged with 1 kg of commercially available diethoxy magnesium granules ("Magnesium ethylate" manufactured by Huls Co., particle size: 500 to 1500 ìm). The granules were pulverized for 5 minutes. The diethoxy magnesium thus obtained was found to have the following properties: bulk density determined by JIS K6721: 0.41 g/ml, specific surface area ($N_2SA$): 9.8 m$^2$/g, sphericity (l/w): 2.0, average particle diameter: 101.9 μm, pore volume: 0.010 ml/g, pore size distribution [ln(R90/R10)]:2.63, content of particles with 5 μm or less diameter: 4.1%, particle size distribution [(D90-D10)/D50]: 2.44.

<Preparation of Solid Catalyst Component>

A 2,000 ml round bottom flask equipped with a stirrer, of which the internal atmosphere had been sufficiently replaced by nitrogen gas, was charged with 150 g of the above-described diethoxy magnesium granules, 750 ml toluene, and 54 ml of di-n-butyl phthalate to prepare a suspension. The suspension was added continuously over one hour to a solution of 450 ml of toluene and 300 ml of titanium tetrachloride in a 3,000 ml round bottom flask equipped with a stirrer, of which the internal atmosphere had been sufficiently replaced by nitrogen gas. In this instance, the reaction system was maintained at 5° C. The temperature was raised to 100° C. over four hours, then reacted for two hours while stirring. After the reaction, the product was subjected to a catalytic reaction for two hours while stirring at 80° C. The resulting reaction mixture was washed seven times with heptane at 40° C., filtered, and dried to obtain a solid catalyst component in the form of a powder. The content of titanium in the solid catalyst component was analyzed and found to be 3.15 wt %. The average particle diameter, specific surface area, pore volume, and pore size distribution of the solid catalyst component were measured. The results are shown in Table 3.

<Preparation of Propylene Block Copolymer>

A propylene block copolymer was prepared in the same manner as in Example 1. Properties of the propylene block copolymer are shown in Table 3.

Comparative Example 2

<Preparation of Solid Catalyst Component>

95.2 g of magnesium dichloride, 442 ml of decane, and 390.6 g of 2-ethylhexyl alcohol were reacted at 130° C. for two hours to obtain a homogeneous solution. 21.3 g of phthalic anhydride was added to this solution and the mixture was stirred at 130° C. for one hour to dissolve the phthalic anhydride, thereby obtaining a homogeneous solution. After cooling to room temperature, 75 ml of the homogeneous solution was added to 200 ml of titanium tetrachloride. The mixture was heated to 110° C., 5.22 g of diisobutyl phthalate was added, and the mixture was heated and reacted for two hours while stirring. After the reaction, the reaction product was suspended again in 275 ml of titanium tetrachloride and processed for two hours at 110° C. The resulting reaction mixture was washed seven times with heptane at 40° C., filtered, and dried to obtain a solid catalyst component in the form of a powder. The content of titanium in the solid catalyst component was analyzed and found to be 2.80 wt %. The average particle diameter, specific surface area, pore volume, and pore size distribution of the solid catalyst component were measured. The results are shown in Table 3.

<Preparation of Propylene Block Copolymer>

A propylene block copolymer was prepared in the same manner as in Example 1, except that propylene polymerization was carried out at 70° C. for one hour and ethylene-propylene copolymerization was carried out at 70° C. for one hour. Properties of the propylene block copolymer are shown in Table 3.

Comparative Example 30

<Preparation of Diethoxy Magnesium>

10 g of iodine was dissolved in 1,000 ml of ethanol. The solution was heated and boiled while refluxing. A slurry of metallic magnesium and ethanol was added continuously to the mixture over two hours, whereby the total 500 g of metallic magnesium was added while reacting the mixture while refluxing. The amount of ethanol added was 7.6 l. After aging for 3 hours, the resulting solid product was washed with ethanol and dried to obtain diethoxy magnesium powder.

The diethoxy magnesium was analyzed to find the following properties: bulk density: 0.26 g/ml, specific surface area ($N_2SA$): 19.8 $m^2/g$, sphericity (l/w): 1.10, average particle diameter: 31 μm, pore volume: 0.03 ml/g, pore size distribution [ln(R90/R10)]: 2.30, content of particles with 5 μm or less diameter: 5%, particle size distribution [(D90-D10)/D50]: 1.05.

<Preparation of Solid Catalyst Component>

A 2,000 ml round bottom flask equipped with a stirrer, of which the internal atmosphere had been sufficiently replaced by nitrogen gas, was charged with 150 g of the above diethoxy magnesium, 750 ml toluene, and 54 ml of di-n-butyl phthalate to prepare a suspension. The suspension was added continuously over one hour to a solution of 450 ml of toluene and 300 ml of titanium tetrachloride in a 3,000 ml round bottom flask equipped with a stirrer, of which the internal atmosphere had been sufficiently replaced by nitrogen gas. In this instance, the reaction system was maintained at 10° C. The above mixed solution was stirred for one hour while maintaining the temperature at 10° C. Then, the temperature was raised to 100° C. in 4 hours, followed reacting it for 2 hours with stirring. After the reaction, the product was subjected to a catalytic reaction for two hours while stirring at 80° C. The resulting reaction mixture was washed seven times with heptane at 40° C., filtered, and dried to obtain a solid catalyst component in the form of a powder. The content of titanium in the solid catalyst component was analyzed and found to be 2.70 wt %. The average particle diameter, specific surface area, pore volume, and pore size distribution of the solid catalyst component were measured. The results are shown in Table 3.

<Preparation of Propylene Block Copolymer>

A propylene block copolymer was prepared in the same manner as in Example 1, except for using the solid catalyst component prepared above. The results are shown in Table 3.

TABLE 3

| | Example | | | | Comparative Example | | |
|---|---|---|---|---|---|---|---|
| | 1 | 2 | 3 | 4 | 1 | 2 | 3 |
| Solid catalyst component | | | | | | | |
| Average particle diameter (μm) | 33 | — | 32 | 30 | 34 | 17 | 36 |
| Specific surface area ($m^2/g$) | 244 | — | 235 | 256 | 222 | 210 | 232 |
| Pore volume (ml/g) | 0.153 | — | 0.193 | 0.115 | 0.207 | 0.250 | 0.310 |
| Pores with pore size of 100Å or less (vol %) | 92 | — | 63 | 95 | 49 | 45 | 38 |
| Pores with pore size of 50Å or less (vol %) | 86 | — | 52 | 88 | 20 | 15 | 25 |
| Polymerization activity (g/g. cat) | 43,200 | 57,600 | 39,800 | 41,500 | 36,200 | 25,800 | 37,100 |
| Rubber portion (Block ratio) A (wt %) | 27.9 | 63.5 | 29.0 | 28.5 | 28.3 | 12.7 | 30.3 |
| Rubber portion on the surface (vol %) | 0.067 | 0.078 | 0.063 | 0.071 | 0.340 | 0.590 | 0.150 |
| Ethylene content (wt %) | 6.0 | 17.1 | 5.8 | 6.3 | 8.2 | 5.5 | 6.8 |
| EPR content (wt %) | 19.6 | 43.0 | 22.5 | 20.1 | 22.2 | 10.0 | 23.5 |
| PP portion MFR(g/10 minutes) | 13.0 | 13.0 | 12.3 | 13.5 | 15.0 | 16.0 | 11.9 |
| PP portion p-Xylene insoluble (wt %) | 80.4 | 57.0 | 82.6 | 83.5 | 77.8 | 87.3 | 80.4 |
| Average diameter of PP section Dpp (μm) | 0.8 | 0.4 | 0.60 | 0.80 | 0.30 | 0.75 | 0.50 |
| Average diameter of rubber section Dr (μm) | 0.08 | 0.21 | 0.11 | 0.07 | 0.19 | 0.26 | 0.17 |

TABLE 3-continued

| | Example | | | | Comparative Example | | |
|---|---|---|---|---|---|---|---|
| | 1 | 2 | 3 | 4 | 1 | 2 | 3 |
| Rubber section accumulative diameter distribution at 90% ($\mu$m) | 0.16 | 0.56 | 0.23 | 0.17 | 0.56 | 0.54 | 0.35 |
| Dpp/Dr | 10.0 | 1.9 | 5.5 | 11.4 | 1.6 | 2.9 | 2.9 |
| MFR | 2.3 | 0.2 | 2.1 | 2.5 | 2.0 | 3.1 | 2.0 |
| Flexural modulus of elasticity (kg/cm$^2$) | 11,190 | 4,000 | 11,020 | 11,850 | 10,290 | 13,400 | 10,860 |
| Izod impact strength (kg. cm/cm) 23° C. | 22 | No break | 23 | 21 | 17 | 7 | 18 |
| Flowability | 0.97 | 0.95 | 0.97 | 0.96 | 0.67 | 0.73 | 0.90 |

INDUSTRIAL APPLICABILITY

The solid catalyst component for polymerization of olefins and the catalyst have high activity. When used for the polymerization of ethylene-propylene copolymers, the solid catalyst component and the catalyst can produce a propylene block copolymer with an excellent novel structure exhibiting well-balanced rigidity and impact resistance. The propylene block copolymer of the present invention possesses a novel structure in which a high proportion of ethylene-propylene copolymer particles (rubber component) are well dispersed in a propylene polymer. In addition, due to a small proportion of rubbers on the particle surface, a high quality propylene block copolymer can be consistently manufactured without causing the polymer particles to adhere among themselves or to adhere to the inner walls of manufacturing equipment. Such a specific structure ensures well-balanced rigidity and impact resistance. The block copolymer is very useful particularly for the application of vehicle parts such as a bumper and parts for household electric appliances.

What is claimed is:

1. A solid catalyst component for polymerization of olefins comprising magnesium, titanium, and a halogen atom, having an average particle diameter of 1 to 100 $\mu$m, a specific surface area of 100 to 500 m$^2$/g, a pore volume of less than 0.3 ml/g, and a pore size distribution in which an cumulative pore volume with a pore diameter of 100 Å or less is more than 80%.

2. The solid catalyst component according to claim 1, having an average pore diameter of 10 to 60 Å and a pore size distribution in which an cumulative pore volume with a pore diameter of 100 < or less is 80% or more.

3. The solid catalyst component according to claim 1, having a pore size distribution in which an cumulative pore volume with a pore diameter of 50 Å or less is 30% or more.

4. A catalyst for polymerization of olefins comprising:
(A) the solid catalyst component according to claim 1, and
(B) an organoaluminum compound of the following formula (1):

$$R^1_p AlQ_{3-p} \quad (1)$$

wherein R$^1$ represents an alkyl group having 1 to 4 carbon atoms, Q represents a hydrogen atom or a halogen atom, and p represents an integer satisfying the formula 0<p≦3.

5. A catalyst for polymerization of olefins comprising:
(A) the solid catalyst component according to claim 1,
(B) an organoaluminum compound of the following formula (1):

$$R^1_p AlQ_{3-p} \quad (1)$$

wherein R$^1$ represents an alkyl group having 1 to 4 carbon atoms, Q represents a hydrogen atom or a halogen atom, and p represents an integer satisfying the formula 0<p≦3, and
(C) an electron donor compound.

6. A solid catalyst component for polymerization of olefins comprising magnesium, titanium, and a halogen atom, having an average particle diameter of 1 to 100 $\mu$m, a specific surface area of 100 to 500 m$^2$/g, a pore volume of less than 0.3 ml/g, a pore size distribution in which an cumulative pore volume with a pore diameter of 100 Å or less is more than 50%, and the particles consist of small primary particles having the average diameter is 0.01 to 0.1 $\mu$m, which aggregate to form secondary particles.

7. A catalyst for polymerization of olefins comprising:
(A) a solid catalyst component for polymerization of olefins comprising magnesium, titanium, and a halogen atom, having an average particle diameter of 1 to 100 $\mu$m, a specific surface area of 100 to 500 m$^2$/g, a pore volume of less than 0.3 ml/g, and a pore size distribution in which an cumulative pore volume with a pore diameter of 100 Å or less is more than 50%,
(B) an organoaluminum compound of the following formula (1): $R_{1p}AlQ_{3-p}(1)$ wherein Rl represents an alkyl group having 1 to 4 carbon atoms, Q represents a hydrogen atom or a halogen atom, and p represents an integer satisfying the formula 0<p≦1, and
(C) an external electron donor compound comprising at least one organosilicon compound.

* * * * *